(12) United States Patent  
Lee et al.

(10) Patent No.: US 8,457,809 B2  
(45) Date of Patent: Jun. 4, 2013

(54) ELECTRONIC DEVICE AND METHOD FOR CONTROLLING UNMANNED AERIAL VEHICLE USING THE SAME

(75) Inventors: Hou-Hsien Lee, Taipei Hsien (TW); Chang-Jung Lee, Taipei Hsien (TW); Chih-Ping Lo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 337 days.

(21) Appl. No.: 12/939,106

(22) Filed: Nov. 3, 2010

(65) Prior Publication Data

US 2011/0320068 A1 Dec. 29, 2011

(30) Foreign Application Priority Data

Jun. 24, 2010 (TW) .................................. 99120712

(51) Int. Cl.
- *G01C 21/00* (2006.01)
- *G01C 21/34* (2006.01)
- *B64C 13/00* (2006.01)
- *G05D 1/00* (2006.01)
- *G06F 17/00* (2006.01)

(52) U.S. Cl.
USPC ...... 701/2; 701/3; 701/14; 701/411; 701/467; 244/76 R; 244/190; 340/945; 340/971

(58) Field of Classification Search
USPC ............ 701/1, 2, 3, 4, 8, 9, 11, 14, 120, 122, 701/400, 408, 409, 410, 411, 418, 423, 467, 701/300, 302; 244/1, 75.1, 175, 189, 190, 244/1 R, 76 R; 340/945, 946, 963, 971
See application file for complete search history.

(56) References Cited

U.S. PATENT DOCUMENTS

| | | | |
|---|---|---|---|
| 6,873,886 B1 * | 3/2005 | Mullen et al. ..................... | 701/2 |
| 7,158,877 B2 * | 1/2007 | Carlsson et al. .................. | 701/2 |
| 7,454,255 B1 * | 11/2008 | Boskovic et al. ............... | 700/79 |
| 7,962,252 B2 * | 6/2011 | Shams et al. ..................... | 701/3 |
| 2004/0193334 A1 * | 9/2004 | Carlsson et al. ................. | 701/9 |
| 2010/0084513 A1 * | 4/2010 | Gariepy et al. ............... | 244/190 |
| 2010/0131121 A1 * | 5/2010 | Gerlock ........................... | 701/2 |

* cited by examiner

*Primary Examiner* — Thomas Tarcza  
*Assistant Examiner* — Edward Pipala  
(74) *Attorney, Agent, or Firm* — Altis Law Group, Inc.

(57) ABSTRACT

A method for controlling an unmanned aerial vehicle (UAV) using an electronic device determines a designated relay station of the UAV using the electronic device, and creates a new flight path for the UAV according to the designated relay station. The method further directs the UAV to fly to the designated relay station upon the condition that the UAV can arrive at the designated relay station, and directs the UAV to fly to a subsequent relay station along the new flight path upon the condition that the UAV has not arrived at an endpoint of the new flight path.

16 Claims, 15 Drawing Sheets

ELECTRONIC DEVICE AND METHOD FOR CONTROLLING UNMANNED AERIAL VEHICLE USING THE SAME

BACKGROUND

1. Technical Field

Embodiments of the present disclosure relate to helicopter control technology, and particularly to an electronic device and method for controlling an unmanned aerial vehicle (UAV) using the electronic device.

2. Description of Related Art

UAVs have been used to perform security surveillance by capturing images of a number of monitored scenes, and sending the captured images to a monitoring computer. However, a flight path of the UAV needs to be changed using a special control software installed in the monitoring computer. That is to say, if an administrator wants to change the flight path of the UAV, the administrator has to go back to the monitoring computer. Accordingly, it is inefficient to control the UAV. Therefore, an efficient method for controlling the flight status of the UAV is desired.

DETAILED DESCRIPTION

All of the processes described below may be embodied in, and fully automated via, functional code modules executed by one or more general purpose electronic devices or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Figure 1:
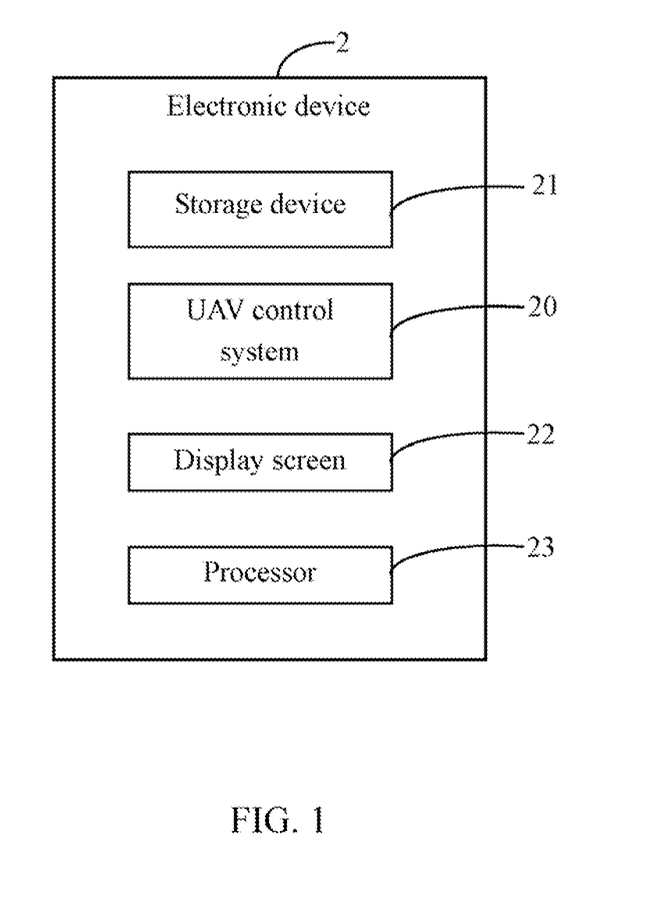
FIG. 1 is a block diagram of one embodiment of an electronic device.

FIG. 1 is a block diagram of one embodiment of an electronic device 2. In one embodiment, the electronic device 2 includes an unmanned aerial vehicle (UAV) control system 20, a storage device 21, a display screen 22, and at least one processor 23. The UAV control system 20 may be used to change a flight path of the UAV, and control the UAV to execute an aerial task. Detailed descriptions will be given in the following paragraphs.

In one embodiment, the UAV may be installed with a global position system (GPS) to determine or acquire position information (e.g., longitude, latitude, and altitude) of the UAV. The UAV further stores a preset flight path and related information of a plurality of relay stations. The flight path is formed by the relay stations, such as A→B→C→D→E→F, for example. The relay station "A" is a start point of the flight path, and the relay station "F" is an endpoint of the flight path. Each of the relay stations has a known longitude, latitude, and elevation. In addition, a refueling equipment and a computer are installed at each of the relay stations to refuel the UAV and store acquired data of the UAV.

In one embodiment, the display screen 22 may be a liquid crystal display (LCD) or a touch-sensitive display, for example. The electronic device 2 may be a mobile phone, a personal digital assistant (PDA) or other suitable electronic device.

In one embodiment, the UAV control system 20 may include one or more modules. The one or more modules may comprise computerized code in the form of one or more programs that are stored in the storage device 21 (or memory). The computerized code includes instructions that are executed by the at least one processor 23 to provide functions for the one or more modules.

Figure 2:
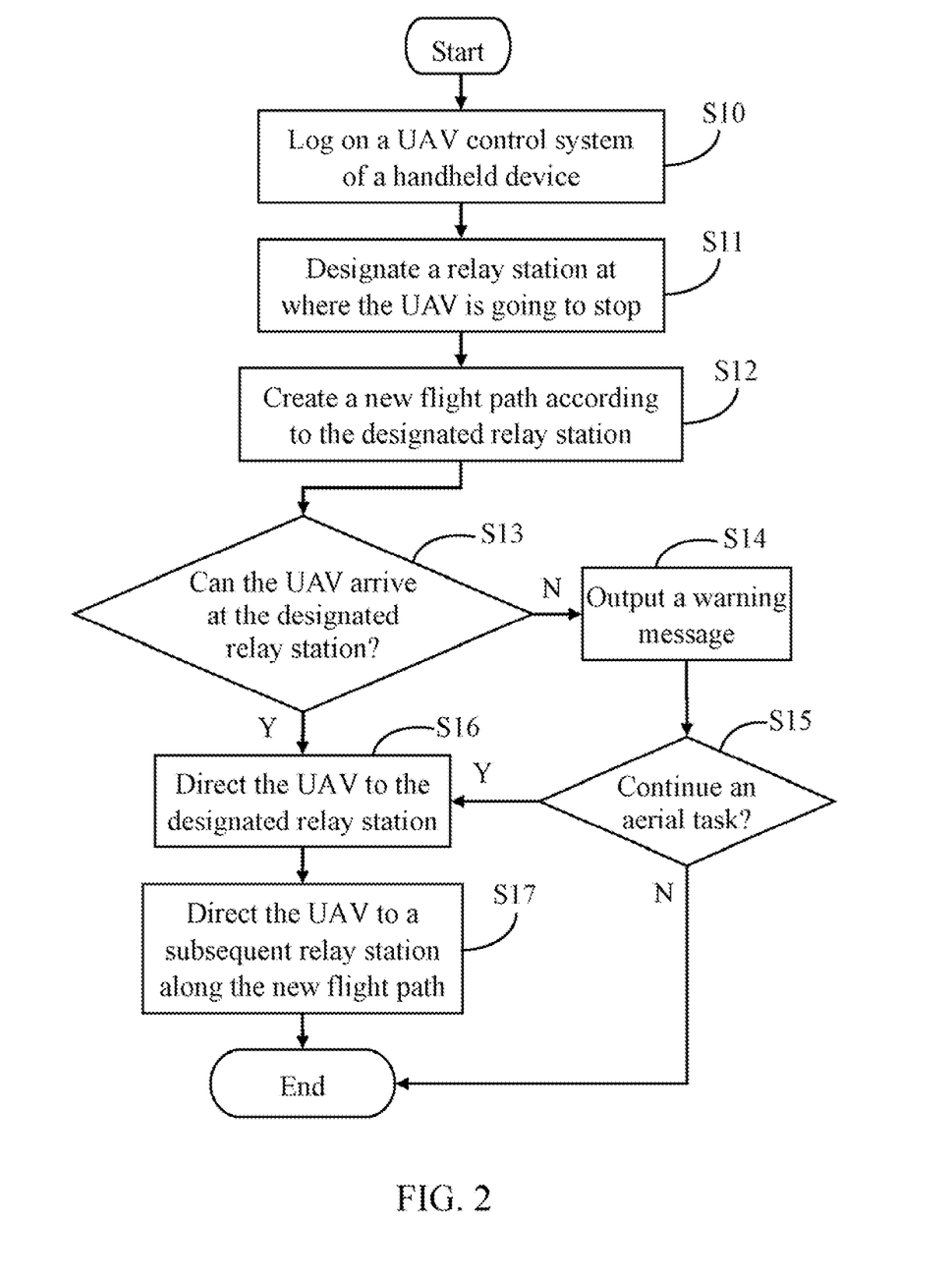
FIG. 2 is a flowchart of a first embodiment of a method for controlling an unmanned aerial vehicle using the electronic device in FIG. 1.

FIG. 2 is a flowchart of a first embodiment of a method for controlling an unmanned aerial vehicle using the electronic device 2. The method in FIG. 2 may be performed by the electronic device (e.g. a mobile phone) having a touch-sensitive display with a graphical user interface (GUI), at least one processor, a storage device and one or more modules, programs or sets of instructions stored in the storage device for performing the method in FIG. 2. In one embodiment, the electronic device provides a number of functions, including wireless communication, for example. Depending on the embodiment, additional blocks may be added, others removed, and the ordering of the blocks may be changed.

Figure 4:
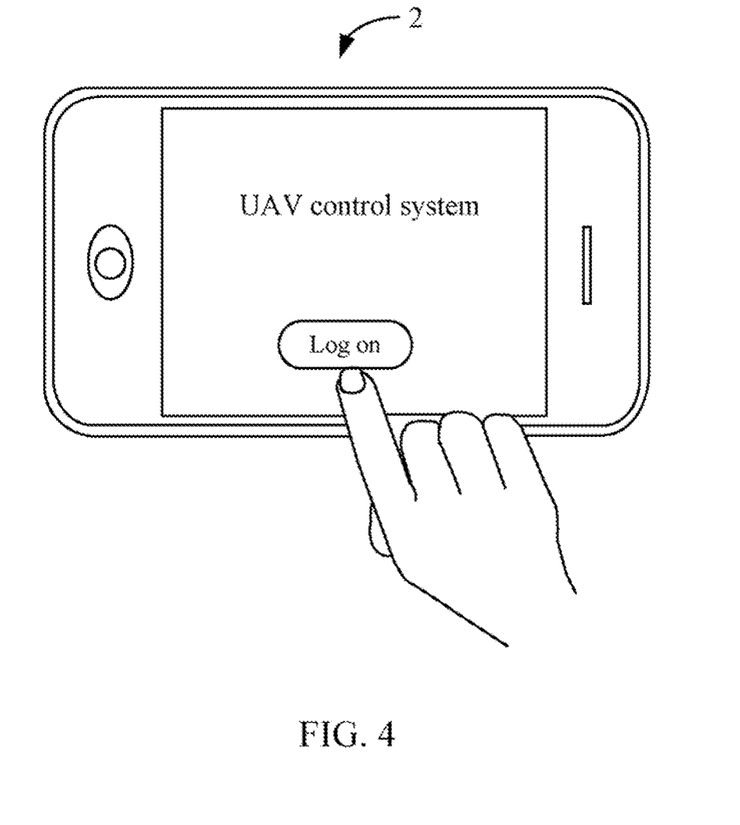
FIGS. 4-9 are schematic diagrams of interfaces of the electronic device of the first embodiment in FIG. 2.
Figure 5:
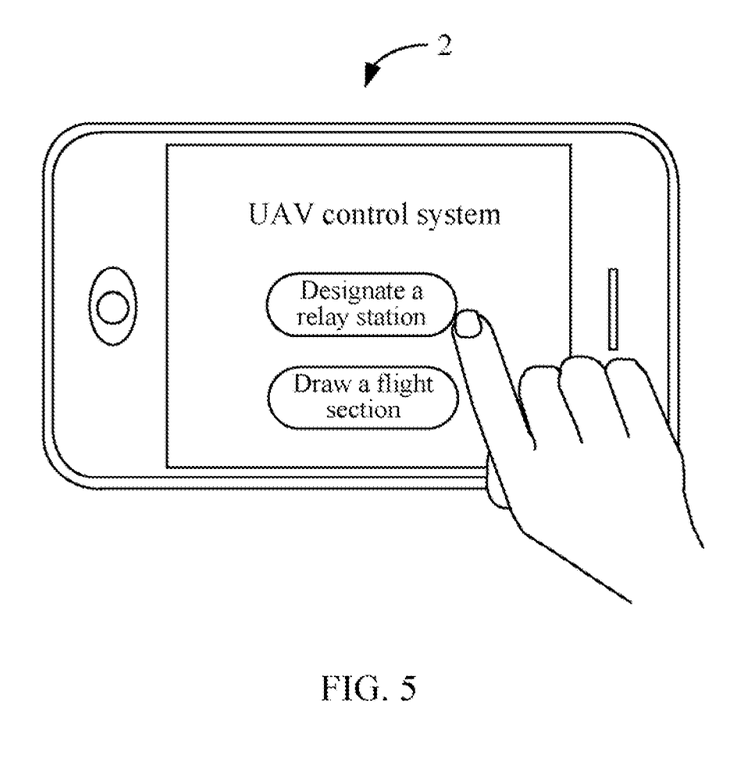
Figure 6:
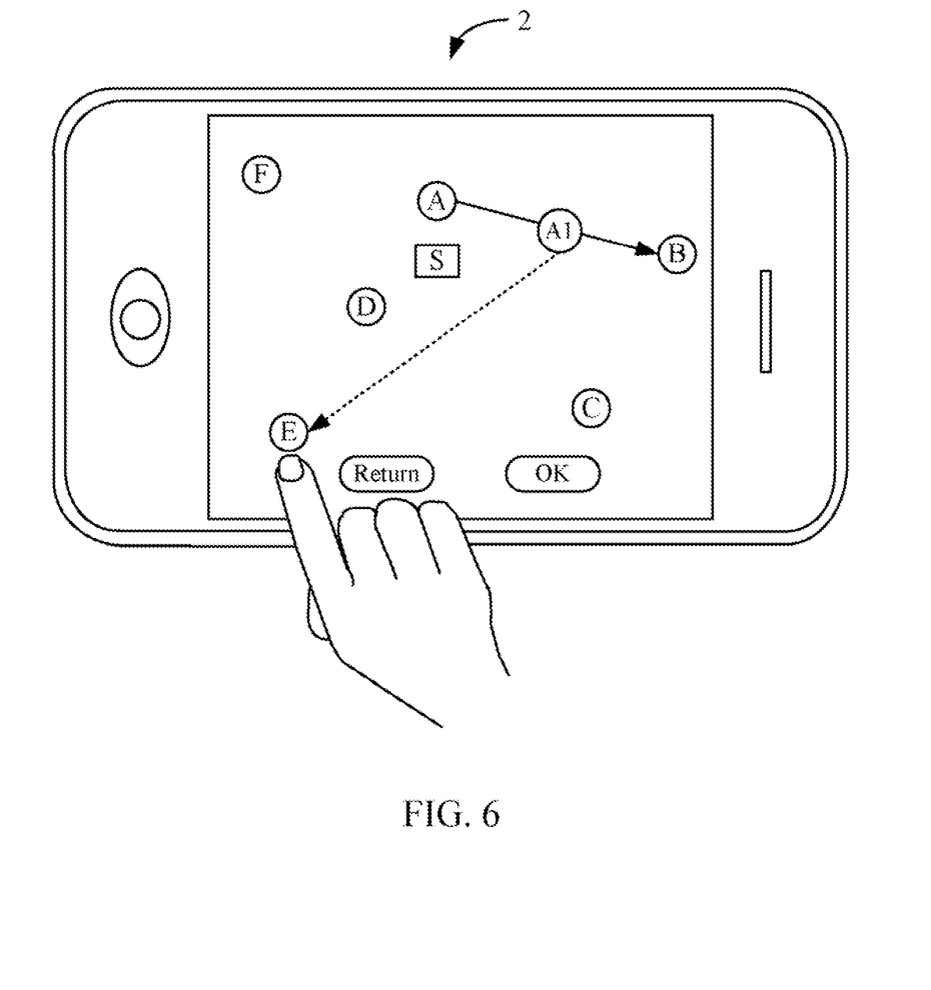

In block S10, a user logs on the UAV control system 20 of the electronic device 2 (as shown in FIG. 4). In one embodiment, two function buttons are presented on the display screen 22 of the electronic device 2. As shown in FIG. 5, a first function button to designate a relay station and a second function button to draw a flight section. In one embodiment, the flight section is a sub-part of the flight path. For example, as shown in FIG. 6, the flight section may be a sub-part from the relay station A to the relay station "B" (e.g., A→B), or from the relay station "B" to the relay station "C" (e.g., B→C). In the first embodiment of the method for controlling the UAV, the user may press the first function button to designate the relay station.

In block S11, the UAV control system 20 determines a designated relay station that the UAV is going to stop. In one embodiment, the designated relay station is selected in a preset flight path of the UAV using the display screen 22 of the electronic device 2. As shown in FIG. 6, a preset flight path is A→B→C→D→E→F, "S" represents a central control computer. Supposing that "A1" represents a current position of the UAV, and the relay station "E" is the designated relay station. A detailed process of designating the relay station "E" is provided as follows. The user selects the current position "A1", drags a finger or a stylus on the display screen 22 to the relay station "E", and selects the "OK" button. It may be understood that the UAV is under a state of hovering when the user designates the relay station "E".

In block S12, the UAV control system 20 creates a new flight path for the UAV according to the designated relay station. As shown in FIG. 6, the new flight path is A→A1→E→F.

In block S13, the UAV control system 20 determines if the UAV can arrive at the designated relay station. If the UAV can arrive at the designated relay station, the procedure goes to block S16. Otherwise, if the UAV cannot arrive at the designated relay station, the procedure goes to block S14.

In one embodiment, if the UAV has not enough power or fuel to support an aerial task of the UAV from the current position "A1" to the designated relay station "E," or a storage unit of the UAV cannot store entire data acquired by the UAV to execute the aerial task, the UAV control system 20 determines that the UAV cannot arrive at the designated relay station "E." If the UAV has enough power and fuel to support the aerial task of the UAV from the current position "A1" to the designated relay station "E", and the storage unit of the UAV can store the entire data acquired by the UAV to execute the aerial task, the UAV control system 20 determines that the UAV can arrive at the designated relay station "E."

Figure 7:
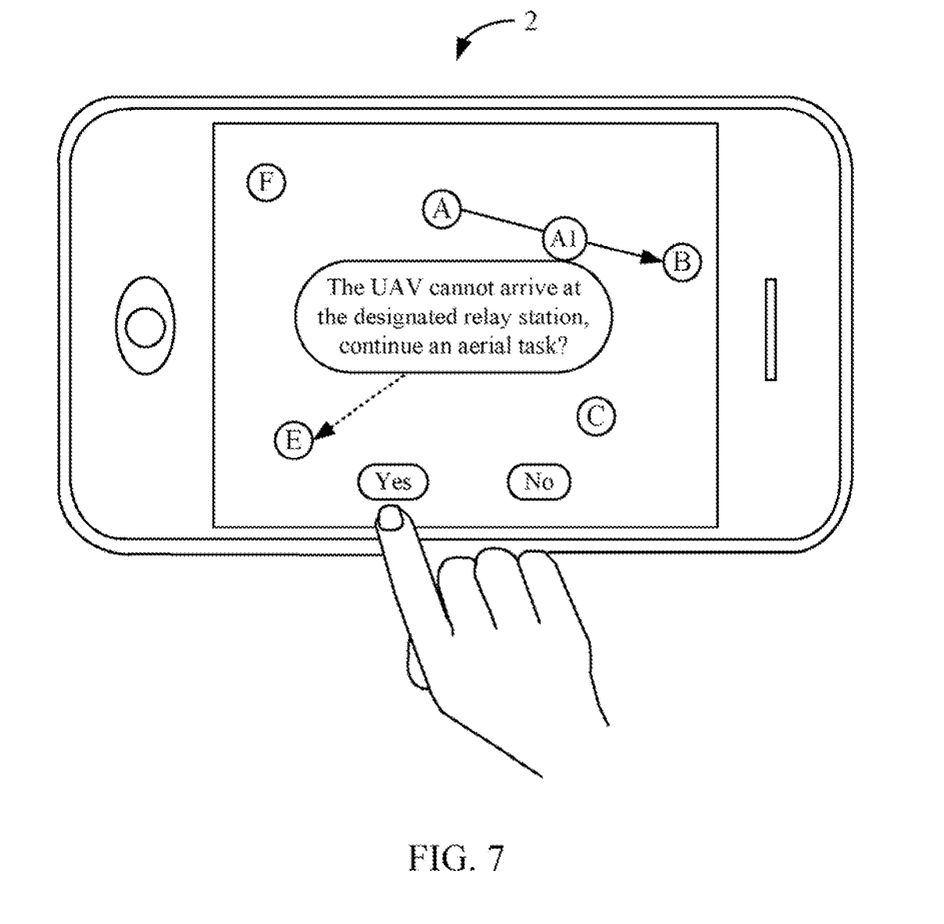

In block S14, the UAV control system 20 outputs a warning message to warn the user if the aerial task of the UAV from the current position to the designated relay station needs to continue. An example of the warning message is shown in FIG. 7.

In block S15, in response to receiving a user selection, the UAV control system 20 determines if the aerial task of the UAV from the current position to the designated relay station needs to continue. For example, as shown in FIG. 7, if the user selects a button of "Yes," the UAV control system 20 determines that the aerial task needs to continue, the procedure goes to block S16. If the user selects a button of "No," the UAV control system 20 determines that the aerial task does not need to continue, the procedure ends.

Figure 8:
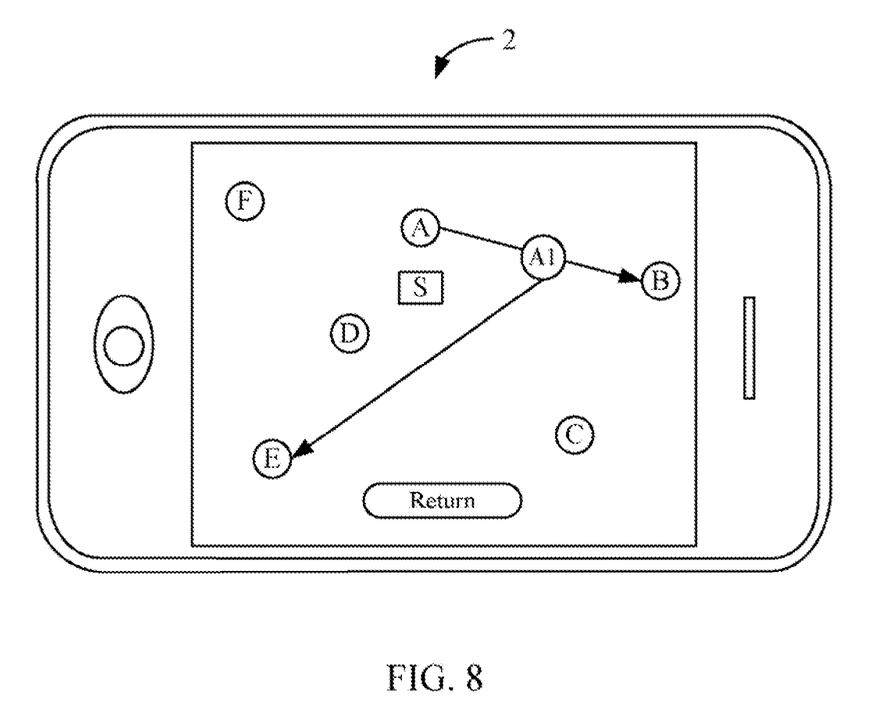

In block S16, the UAV control system 20 directs the UAV to fly to the designated relay station. As shown in FIG. 8, the UAV executes the aerial task from the current position "A1" to the designated relay station "E."

Figure 9:
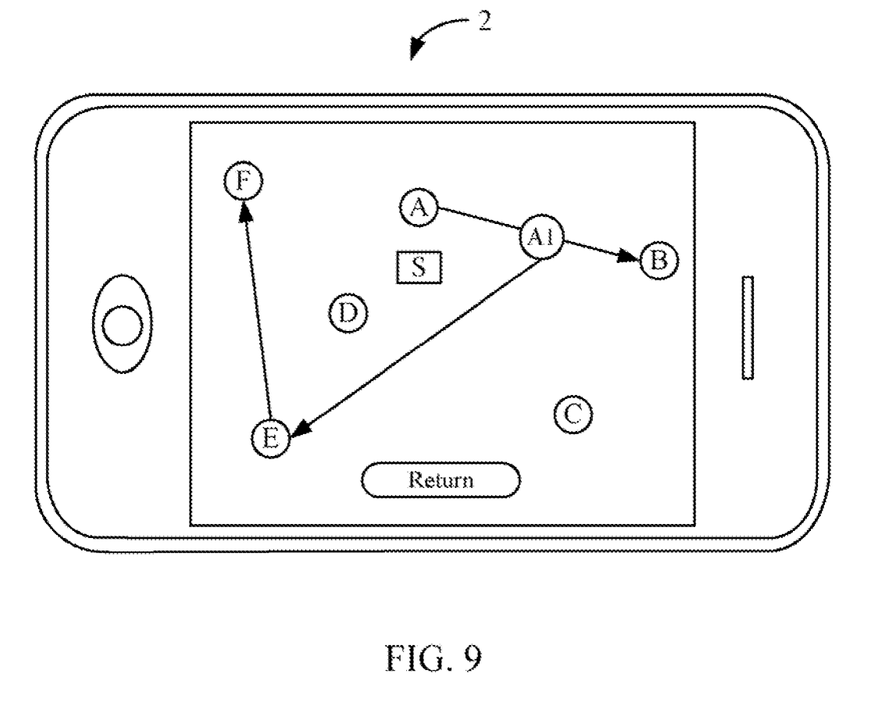

In block S17, the UAV control system 20 directs the UAV to fly to a subsequent relay station along the new flight path if the UAV has not arrived at an endpoint of the new flight path. As shown in FIG. 9, the UAV control system 20 directs the UAV to fly to the relay station "F" after the UAV has landed on the relay station "E."

In other embodiments, the blocks S14 and S15 may be removed. That is to say, if the UAV control system 20 determines the UAV cannot arrive at the designated relay station in block S13, the procedure ends directly.

Figure 3:
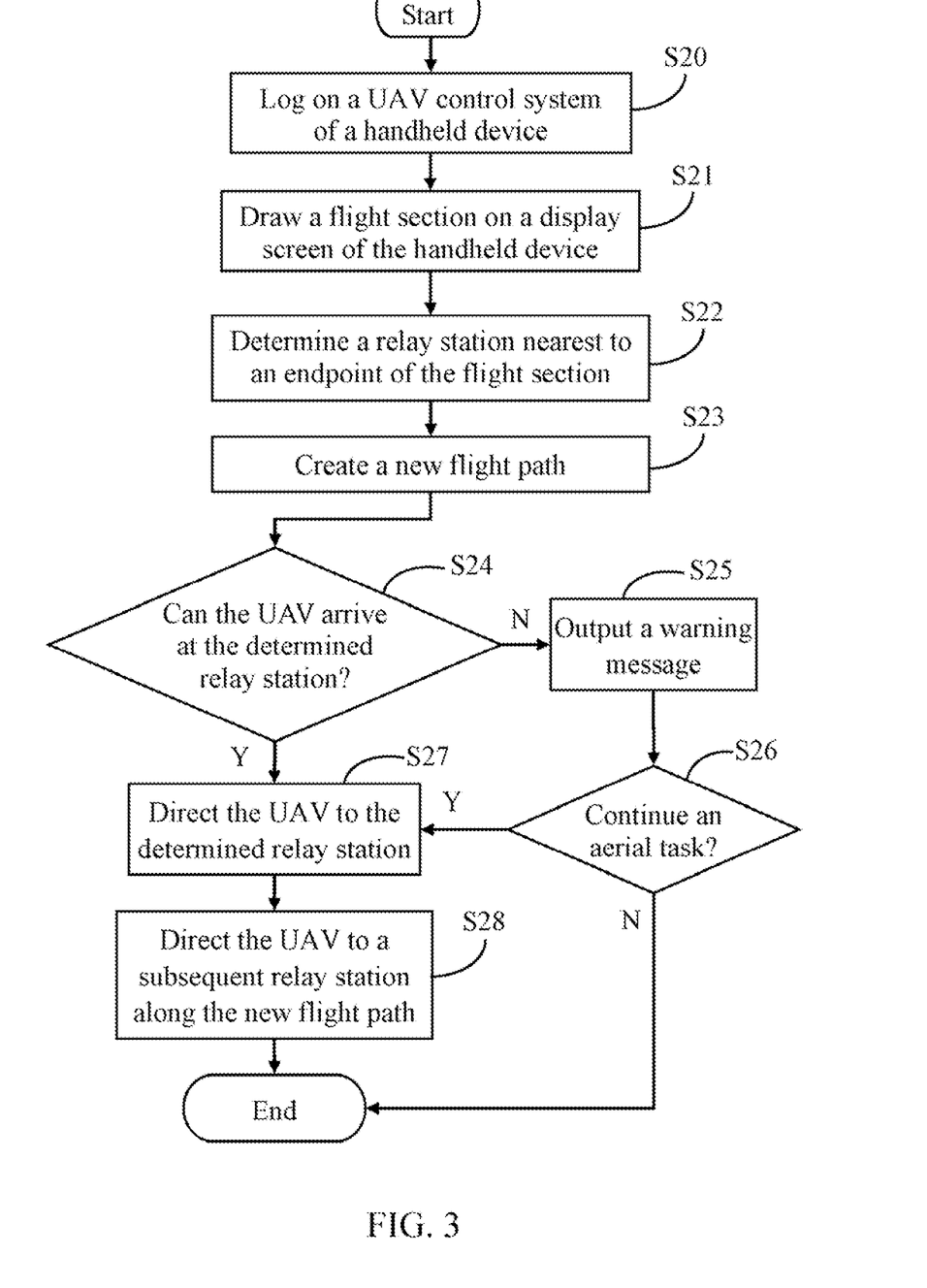
FIG. 3 is a flowchart of a second embodiment of a method for controlling an unmanned aerial vehicle using the electronic device in FIG. 1.

FIG. 3 is a flowchart of a second embodiment of a method for controlling an unmanned aerial vehicle using the electronic device 2. The method in FIG. 3 may be performed by an electronic device (e.g. a mobile phone) having a touch-sensitive display with a graphical user interface (GUI), at least one processor, a storage device and one or more modules, programs or sets of instructions stored in the storage device for performing the method in FIG. 3. In one embodiment, the electronic device provides a number of functions, including wireless communication, for example. Depending on the embodiment, additional blocks may be added, others removed, and the ordering of the blocks may be changed.

Figure 10:
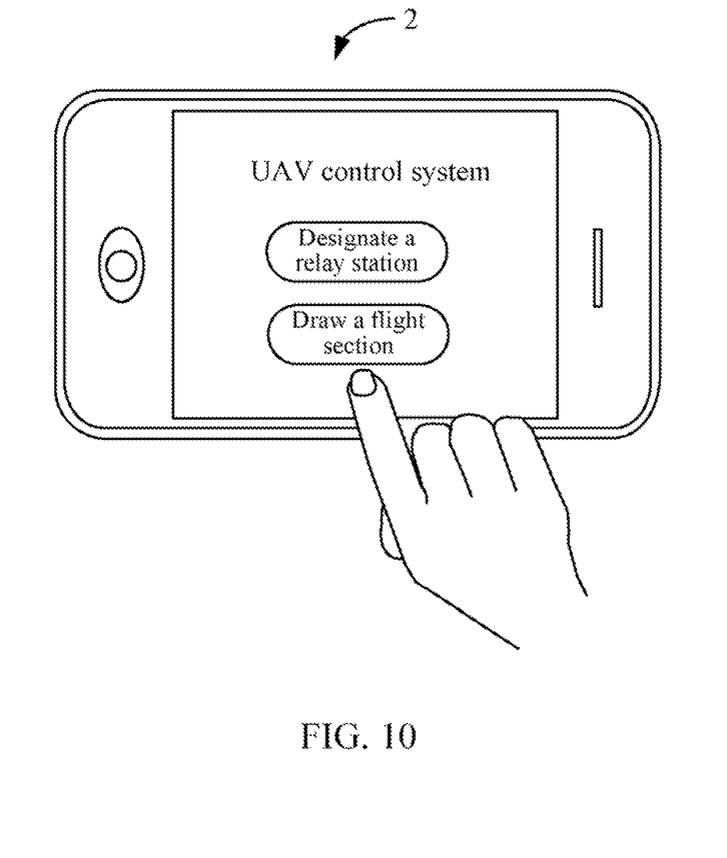
FIGS. 10-15 are schematic diagrams of interfaces of the electronic device of the second embodiment in FIG. 3.
Figure 11:
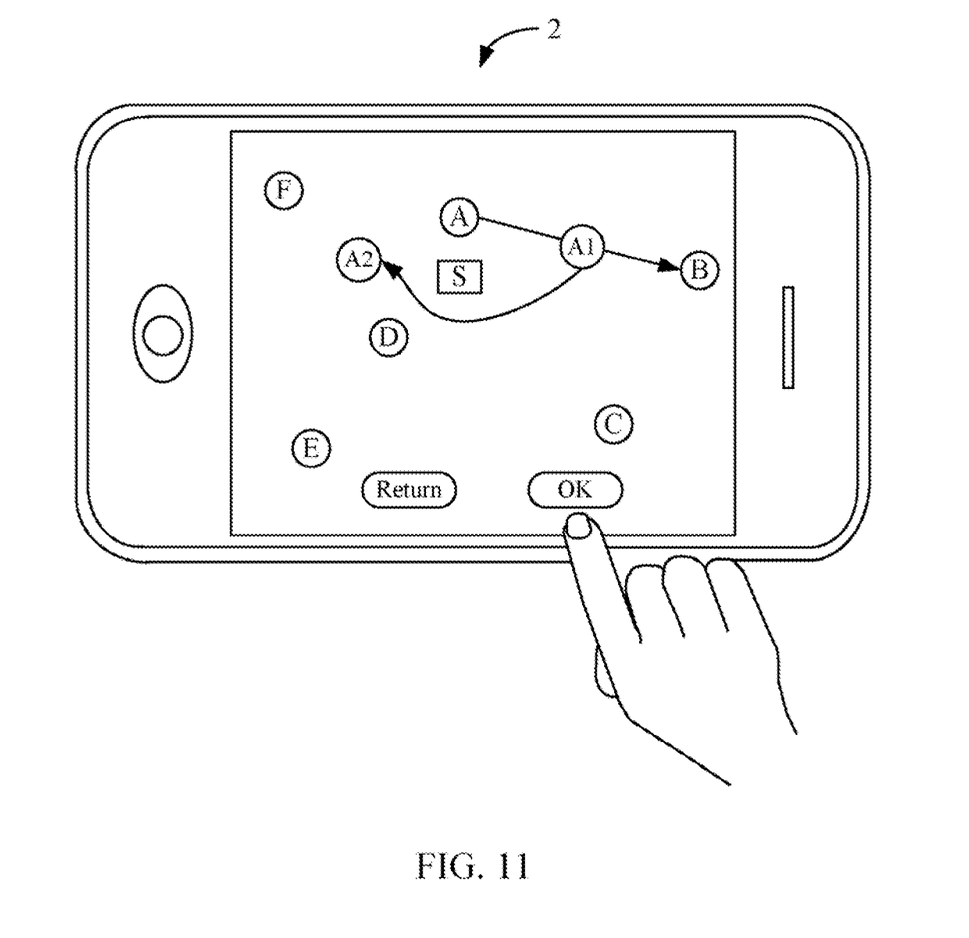

In block S20, a user logs on the UAV control system 20 of the electronic device (as shown FIG. 4) 2. As shown in FIG. 10, in the second embodiment of the method for controlling the UAV, the user selects the second button of "draw a flight section." In one embodiment, the flight section is a sub-part of a flight path. For example, as shown in FIG. 11, the flight section may be a straight line (e.g., AB) or a curve (e.g., A1A2).

In block S21, the UAV control system 20 determines a flight section drawn on the display screen 22 of the electronic device 2. In one embodiment, the flight section includes a start point and an endpoint, and the start point is a current position of the UAV in a preset flight path. As shown in FIG. 11, a preset flight path is A→B→C→D→E→F, and "S" represents a central control computer. Supposing that "A1" represents the current position of the UAV, and "A2" represents the endpoint of the flight section drawn by the user. A detailed process of drawing the flight section is provided as follows. The user selects the current position "A1," drags a finger or a stylus on the display screen 22 to the endpoint "A2," and selects the "OK" button. It may be understood that the UAV is hovering when the user draws the flight section.

Figure 12:
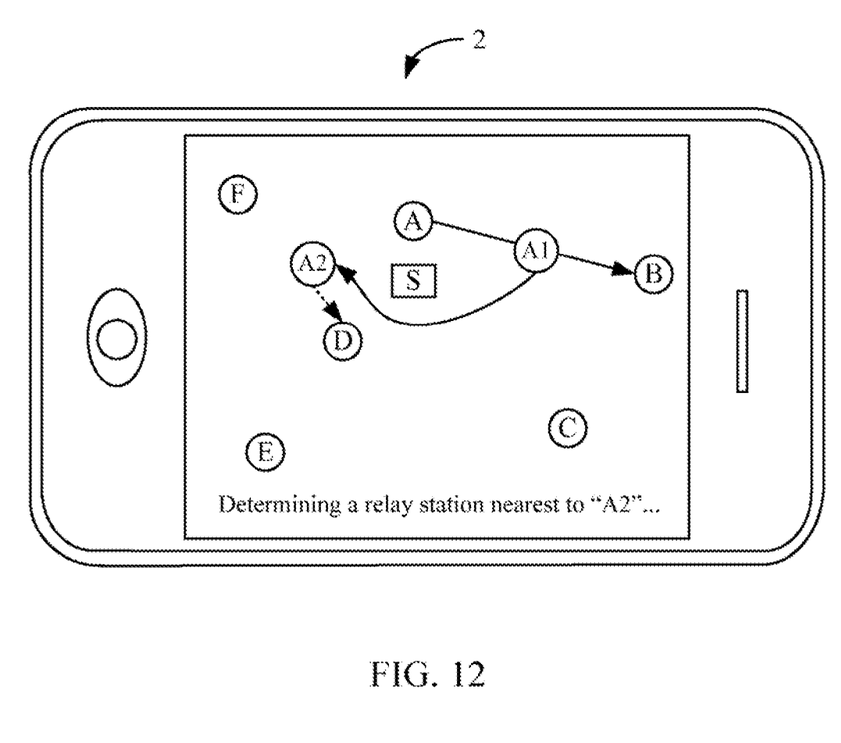

In block S22, the UAV control system 20 determines a relay station nearest to the endpoint of the flight section. As shown in FIG. 12, the relay station "D" is the determined relay station nearest to the endpoint "A2" of the flight section.

In block S23, the UAV control system 20 creates a new flight path for the UAV according to the determined relay station. As shown in FIG. 12, the new flight path is A→A1→A2→D→E→F.

In block S24, the UAV control system 20 determines if the UAV can arrive at the determined relay station. If the UAV can arrive at the determined relay station, the procedure goes to block S27. Otherwise, if the UAV cannot arrive at the determined relay station, the procedure goes to block S25.

In one embodiment, if the UAV has not enough power or fuel to support an aerial task of the UAV from the current position "A1" to the endpoint "A2" of the flight section, and further from the endpoint "A2" to the determined relay station "D" (i.e., A1A2+A2D), or a storage unit of the UAV cannot store entire data acquired by the UAV to execute the aerial task, the UAV control system 20 determines that the UAV cannot arrive at the determined relay station "D." If the UAV has enough power and fuel to support the aerial task of the UAV from the current position "A1" to the endpoint "A2" of the flight section, and further from the endpoint "A2" to the determined relay station "D", and the storage unit of the UAV can store the entire data acquired by the UAV during the aerial task, the UAV control system 20 determines that the UAV can arrive at the determined relay station "D."

Figure 13:
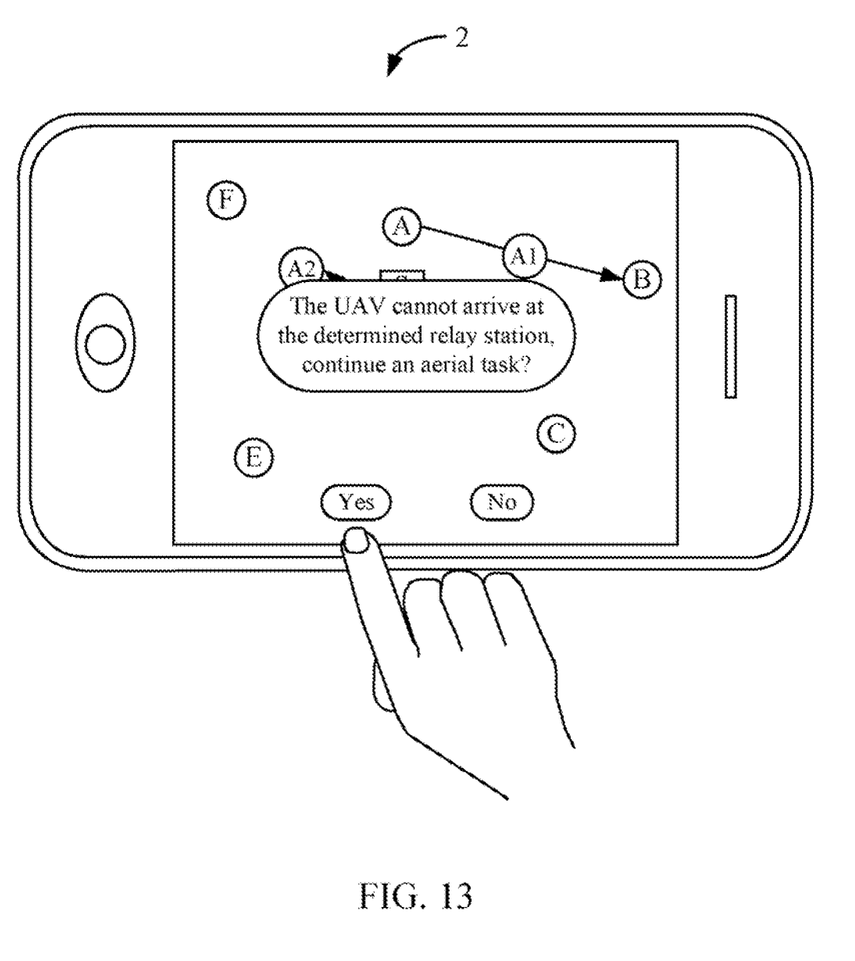

In block S25, the UAV control system 20 outputs a warning message to warn the user if the aerial task of the UAV from the current position to the determined relay station needs to continue. An example of the warning message is shown in FIG. 13.

In block S26, in response to receiving a user selection, the UAV control system 20 determines if the aerial task of the UAV from the current position to the determined relay station needs to continue. For example, as shown in FIG. 13, if the user selects a button of "Yes," the UAV control system 20 determines that the aerial task needs to continue, the procedure goes to block S27. If the user selects a button of "No," the UAV control system 20 determines the aerial task does not need to continue, the procedure ends.

Figure 14:
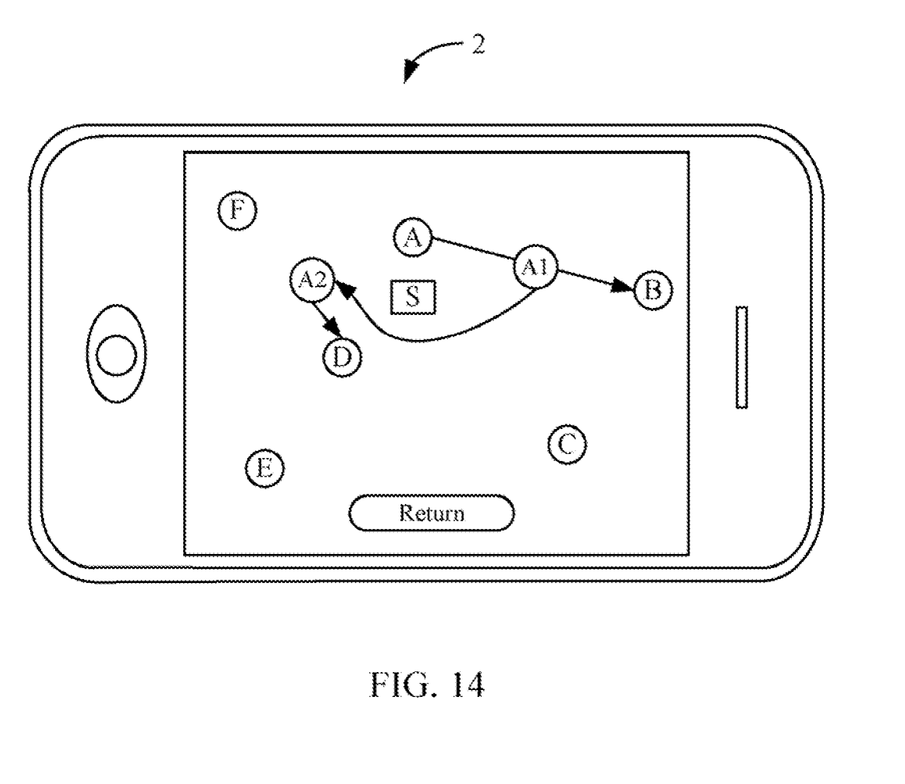

In block S27, the UAV control system 20 directs the UAV to fly to the determined relay station. As shown in FIG. 14, the UAV executes the aerial task from the current position "A1" to the endpoint "A2" of the flight section, and further from the endpoint "A2" to the determined relay station "D."

Figure 15:
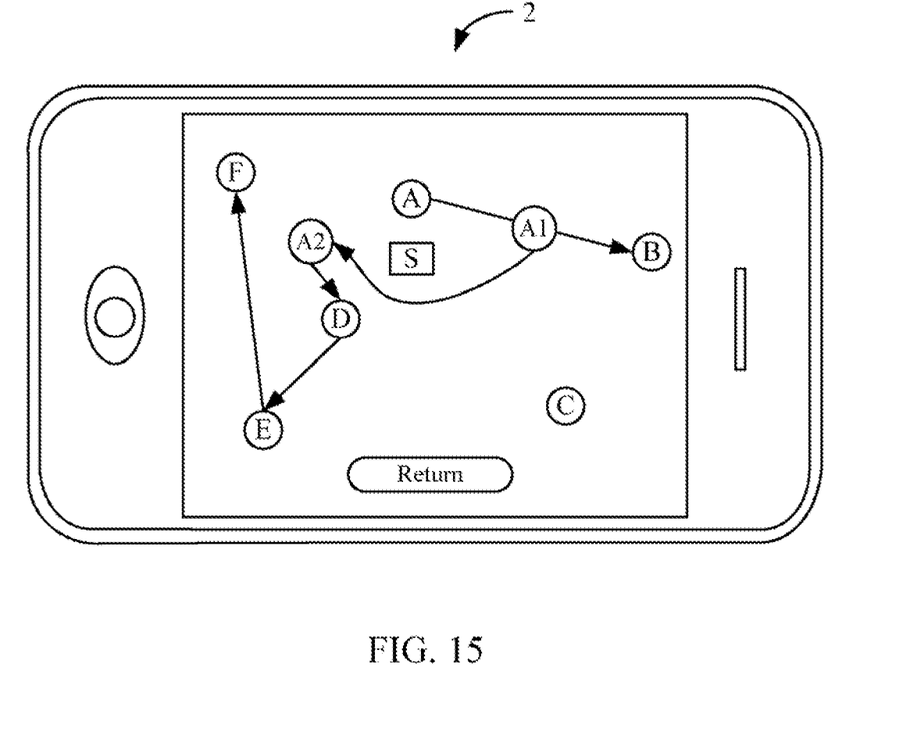

In block S28, the UAV control system 20 directs the UAV to fly to a subsequent relay station along the new flight path if the UAV has not arrived at an endpoint of the new flight path. As shown in FIG. 15, the UAV control system 20 directs the UAV to fly to the relay station "E" after the UAV has landed on the relay station "D," and further directs the UAV to fly to the relay station "F."

In other embodiments, the blocks S25 and S26 may be removed. That is to say, if the UAV control system 20 determines the UAV cannot arrive at the determined relay station in block S24, the procedure ends directly.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for controlling an unmanned aerial vehicle (UAV) using an electronic device, comprising:
   determining a designated relay station of the UAV, the designated relay station being selected in a preset flight path of the UAV using the electronic device;
   creating a new flight path for the UAV by removing specified relay stations of the preset flight path between a current position of the UAV and the designated relay station;
   determining if the UAV can arrive at the designated relay station;
   directing the UAV to execute an aerial task from the current position of the UAV to the designated relay station upon the condition that the UAV can arrive at the designated relay station; and
   directing the UAV to fly to a subsequent relay station along the new flight path upon the condition that the UAV has not arrived at an endpoint of the new flight path.

2. The method according to claim 1, wherein the step of determining if the UAV can arrive at the designated relay station comprises:
   determining that the UAV cannot arrive at the designated relay station upon the condition that the UAV has not enough power or fuel to support the aerial task of the UAV from the current position to the designated relay station, or a storage unit of the UAV cannot store entire data acquired by the UAV to execute the aerial task; or
   determining that the UAV can arrive at the designated relay station upon the condition that the UAV has enough power and fuel to support the aerial task of the UAV from the current position to the designated relay station, and the storage unit of the UAV can store the entire data acquired by the UAV to execute the aerial task.

3. The method according to claim 1, further comprising:
   outputting a warning message to warn if an aerial task of the UAV from a current position to the designated relay station needs to continue upon the condition that the UAV cannot arrive at the designated relay station.

4. The method according to claim 3, further comprising:
   directing the UAV to fly to the designated relay station upon the condition that the aerial task needs to continue.

5. A method for controlling an unmanned aerial vehicle (UAV) using an electronic device, comprising:
   determining a flight section drawn on a display screen of the electronic device, the flight section comprising a start point and an endpoint, the start point being a current position of the UAV in a preset flight path;
   determining a relay station nearest to the endpoint of the flight section;
   creating a new flight path for the UAV by removing specified relay stations of the preset flight path between the current position of the UAV and the determined relay station;
   determining if the UAV can arrive at the determined relay station;
   directing the UAV to execute an aerial task from the current position of the UAV to the endpoint of the flight section and further from the endpoint to the determined relay station upon the condition that the UAV can arrive at the determined relay station; and
   directing the UAV to fly to a subsequent relay station along the new flight path upon the condition that the UAV has not arrived at an endpoint of the new flight path.

6. The method according to claim 5, wherein the step of determining if the UAV can arrive at the determined relay station comprises:
   determining that the UAV cannot arrive at the determined relay station upon the condition that the UAV has not enough power or fuel to support the aerial task of the UAV from the current position to the endpoint of the flight section and further from the endpoint to the determined relay station, or a storage unit of the UAV cannot store entire data acquired by the UAV to execute the aerial task; or
   determining that the UAV can arrive at the determined relay station upon the condition that the UAV has enough power and fuel to support the aerial task of the UAV from the current position to the endpoint of the flight section and further from the endpoint to the determined relay station, and the storage unit of the UAV can store the entire data acquired by the UAV to execute the aerial task.

7. The method according to claim 5, further comprising:
   outputting a warning message to warn if an aerial task of the UAV from a current position to the determined relay station needs to continue upon the condition that the UAV cannot arrive at the determined relay station.

8. The method according to claim 7, further comprising:
   directing the UAV to fly to the determined relay station upon the condition that the aerial task needs to continue.

9. An electronic device, comprising:
   a display screen;
   a storage device;
   at least one processor; and
   one or more modules that are stored in the storage device and are executed by the at least one processor, the one or more modules comprising instructions:
   to determine a designate relay station of the UAV, the designated relay station being selected in a preset flight path of the UAV using the electronic device;
   to create a new flight path for the UAV by removing specified relay stations of the preset flight path between a current position of the UAV and the designated relay station;
   to determine if the UAV can arrive at the designated relay station;
   to direct the UAV to execute an aerial task from the current position of the UAV to the designated relay station upon the condition that the UAV can arrive at the designated relay station; and
   to direct the UAV to fly to a subsequent relay station along the new flight path upon the condition that the UAV has not arrived at an endpoint of the new flight path.

10. The electronic device according to claim 9, wherein the instruction to determine if the UAV can arrive at the designated relay station comprises:
    determining that the UAV cannot arrive at the designated relay station upon the condition that the UAV has not enough power or fuel to support the aerial task of the UAV from the current position to the designated relay station, or a storage unit of the UAV cannot store entire data acquired by the UAV to execute the aerial task; or
    determining that the UAV can arrive at the designated relay station upon the condition that the UAV has enough power and fuel to support the aerial task of the UAV from the current position to the designated relay station, and the storage unit of the UAV can store the entire data acquired by the UAV to execute the aerial task.

11. The electronic device according to claim 9, wherein the one or more modules further comprising instructions: to output a warning message to warn if an aerial task of the UAV from a current position to the designated relay station needs to continue upon the condition that the UAV cannot arrive at the designated relay station.

12. The electronic device according to claim 11, wherein the one or more modules further comprising instructions to: direct the UAV to fly to the designated relay station upon the condition that the aerial task needs to continue.

13. An electronic device, comprising:
a display screen;
a storage device;
at least one processor; and
one or more modules that are stored in the storage device and are executed by the at least one processor, the one or more modules comprising instructions:
to determine a flight section drawn on a display screen of the electronic device, the flight section comprising a start point and an endpoint, the start point being a current position of the UAV in a preset flight path;
to determine a relay station nearest to the endpoint of the flight section;
to create a new flight path for the UAV by removing specified relay stations of the preset flight path between the current position of the UAV and the determined relay station;
to determine if the UAV can arrive at the determined relay station;
to direct the UAV to execute an aerial task from the current position of the UAV to the endpoint of the flight section and further from the endpoint to the determined relay station upon the condition that the UAV can arrive at the determined relay station; and
to direct the UAV to fly to a subsequent relay station along the new flight path upon the condition that the UAV has not arrived at an endpoint of the new flight path.

14. The electronic device according to claim 13, wherein the instruction to determine if the UAV can arrive at the determined relay station comprises:
determining that the UAV cannot arrive at the determined relay station upon the condition that the UAV has not enough power or fuel to support the aerial task of the UAV from the current position to the endpoint of the flight section and further from the endpoint to the determined relay station, or a storage unit of the UAV cannot store entire data acquired by the UAV to execute the aerial task; or
determining that the UAV can arrive at the determined relay station upon the condition that the UAV has enough power and fuel to support the aerial task of the UAV from the current position to the endpoint of the flight section and further from the endpoint to the determined relay station, and the storage unit of the UAV can store the entire data acquired by the UAV to execute the aerial task.

15. The electronic device according to claim 13, wherein the one or more modules further comprising instructions to: output a warning message to warn if an aerial task of the UAV from a current position to the determine relay station needs to continue upon the condition that the UAV cannot arrive at the determined relay station.

16. The electronic device according to claim 15, wherein the one or more modules further comprising instructions to: direct the UAV to fly to the determined relay station upon the condition that the aerial task needs to continue.

* * * * *